United States Patent [19]

Chane-Ching et al.

[11] Patent Number: 5,035,834
[45] Date of Patent: Jul. 30, 1991

[54] NOVEL CERIUM (IV) COMPOUNDS

[75] Inventors: Jean-Yves Chane-Ching, Paris; Jean-Luc Le Loarer, La Rochelle, both of France

[73] Assignee: Rhone-Poulenc Chimie, Courbevoie, France

[21] Appl. No.: 30,134

[22] Filed: Mar. 26, 1987

[30] Foreign Application Priority Data

Mar. 26, 1986 [FR] France ................... 86 04346

[51] Int. Cl.$^5$ ................ B01J 13/00; C01B 21/48
[52] U.S. Cl. ................ 252/313.1; 423/395; 423/397
[58] Field of Search ............. 252/313.1; 423/395, 423/396, 397

[56] References Cited

U.S. PATENT DOCUMENTS

| | | | |
|---|---|---|---|
| 2,166,702 | 7/1939 | Blumenfeld | 423/395 |
| 2,327,992 | 8/1943 | Blumenfeld | |
| 3,024,199 | 3/1962 | Pasfield | 252/313.1 |
| 4,231,997 | 11/1980 | Pitts | 423/395 |
| 4,606,847 | 8/1986 | Woodhead | 252/313.1 |
| 4,663,137 | 5/1987 | Chane-Ching et al. | |
| 4,699,732 | 10/1987 | Woodhead | 252/313.1 |

FOREIGN PATENT DOCUMENTS

WO7900248 5/1979 United Kingdom .
2075478 11/1981 United Kingdom .

OTHER PUBLICATIONS

Chemical Abstracts 67(6):26296j.
Nikolaev et al, *Russian Journal of Inorganic Chemistry*, vol. 12, No. 4 (1967).

*Primary Examiner*—Wayne A. Langel
*Attorney, Agent, or Firm*—Burns, Doane, Swecker and Mathis

[57] ABSTRACT

Novel cerium (IV) compounds having the Formula (I):

$$Ce(OH)_x(NO_3)_y, pCeO_2 \cdot nH_2O \qquad (I)$$

can be directly dispersed in water to produce unique colloidal dispersions thereof.

39 Claims, 2 Drawing Sheets 1 cm = 909 Å

1 cm = 909 Å

1 cm = 909 Å

NOVEL CERIUM (IV) COMPOUNDS

CROSS-REFERENCE TO RELATED APPLICATIONS

Copending applications include Ser. No. 485,852, filed Feb. 22, 1990, and Ser. No. 030,133, filed Mar. 26, 1987, both assigned to the assignee hereof.

BACKGROUND OF THE INVENTION

1. Field of the Invention

The present invention relates to a novel cerium (IV) compound, to a process for the preparation thereof, and, more especially, to a novel cerium (IV) compound directly dispersible in water.

2. Description of the Prior Art

It is known to this art, from Kirk-Othmer, *Encyclopedia of Chemical Technology*, Second Edition, Vol. 4, p. 850, that it is possible to prepare a hydrated ceric dioxide of the formula $CeO_2 \cdot xH_2O$, wherein x is a number ranging from 0.5 to 2, the compound being present in the form of a gelatinous precipitate, by the addition of ammonium or sodium hydroxide to solutions of ceric salts.

French Patent No. 2,482,075 describes preparation of a cerium (IV) compound dispersible in water by dispersing an essentially dry hydrate of cerium (IV) oxide in an aqueous medium, said oxide having been heat treated at a temperature of from 200° C. to 450° C. in the presence of a deaggregating agent, in particular nitric acid. Heating in the presence of the deaggregating agent effects disintegration of the aggregate crystallites in the hydrate of the cerium (IV) oxide, thereby producing a dispersible cerium compound.

It is noted in the ∝ 075 patent that the preparation of the hydrate of cerium (IV) oxide may be by precipitation from a cerium salt; thus, for example, a high purity cerous carbonate may be dissolved in a solution of nitric or hydrochloric acid to provide a neutral solution of cerous nitrate or chloride, which is oxidized with $NH_4OH/H_2O_2$ to produce the hydrate of cerium (IV) oxide.

SUMMARY OF THE INVENTION

Accordingly, a major object of the present invention is the provision of a directly dispersible cerium (IV) oxide by a process that does not require treatment with a deaggregating agent prior to producing the colloidal dispersion.

Briefly, the compound of cerium (IV) according to the invention has the following general Formula (I):

$$Ce(OH)_x(NO_3)_y, pCeO_2 \cdot nH_2O \quad (I)$$

wherein:

x is such that $x = 4 - y$;

y ranges from 0.35 to 1.5;

p is greater than or equal to 0 and less than or equal to 2.0;

n is greater than or equal to 0 and less than or equal to about 20.

The cerium (IV) compound having the general Formula (I) is directly dispersible in water, enabling production of a colloidal dispersion of the cerium (IV) compound, hereinafter referred to as a "sol".

Its composition, to be more fully described below, may vary within the limits defined in Formula (I) above, as a function of the more or less vigorous drying conditions for the hydrated cerium (IV) hydroxynitrate prepared by hydrolysis, and which circumscribes another object of the present invention.

The present invention, thus, also features a process for the preparation of a compound of Formula (I), comprising hydrolyzing an aqueous solution of a cerium (IV) salt in an acidic medium, separating the precipitate which results and optionally heat treating such precipitate.

DETAILED DESCRIPTION OF THE PREFERRED EMBODIMENTS OF THE INVENTION

More particularly according to the present invention, in a first stage, an aqueous solution of a cerium (IV) salt is hydrolyzed.

The starting material for this includes a cerium (IV) solution which may be an aqueous solution of ceric nitrate. This solution may contain, without disadvantage, cerium in the cerous state, but it is desirable in order to obtain a good yield of precipitation that it contain at least 85% cerium (IV).

The solution of the cerium salt is selected such that it does not contain impurities that may be transferred into the final product. It is advantageous to use a cerium salt solution having a degree of purity greater than 99%.

The concentration of the solution of the cerium salt is not a critical factor according to the invention. When expressed as cerium (IV), it may range from 0.3 to 3 moles per liter, preferably from 0.5 to 1.5 moles/liter.

As suitable starting material, a ceric nitrate solution is used, prepared by the action of nitric acid on a hydrated ceric oxide produced in a conventional manner, by the reaction of a cerous salt solution, for example, cerous carbonate, with an ammonia solution in the presence of an oxidizing agent, preferably hydrogen peroxide.

The ceric nitrate solution prepared by electrolytic oxidation of a cerous nitrate solution, as described in French Patent No. 2,570,087 (No. 84/13641), is the preferred starting material.

The medium of hydrolysis comprises water, the nature of which is not critical and which preferably is distilled or deionized water.

The acidity may be imparted by the addition of an inorganic acid. Preferably, nitric acid is used. Any such acid that may be concentrated or diluted to, for example, $10^{-2}$ N, is representative.

It may also be provided from the ceric nitrate solution which may be slightly acidic, and which may have a normality ranging from 0.01 N to 5 N, and preferably from 0.1 N to 1 N.

The amount of H+ ions introduced by the hydrolysis reaction is such that the molar ratio $[H^+]/Ce^{IV}$ eq ] is greater than or equal to 0 and less than or equal to 3.

Preferably, a molar ratio $[H^+]/Ce^{IV}$ eq ] is selected of from 0.4 to 2.5.

The ratio between the aqueous solution of the cerium (IV) and the hydrolysis medium (essentially water) is such that the final equivalent concentration in cerium (IV) ranges from 0.1 mole/liter to 1 mole/liter, preferably from 0.2 to 0.6 mole/liter.

The final equivalent concentration in cerium (IV) is represented by the following equation:

$$[Ce^{IV} eq.] = ([Ce^{IV}] \times V')/(V + V')$$

wherein:

$[Ce^{IV}]$ is the concentration in moles/liter of the cerium (IV) salt solution;

V represents the volume of water, optionally containing an acid; and

V' is the volume of the cerium (IV) solution.

The hydrolysis of the cerium (IV) salt under the aforesaid conditions is carried out at a temperature of from 70° C. and 120° C. and preferably at the reflux temperature of the reaction medium, on the order of 100° C.

It is far easier to carry out such reaction reflux temperature, which is readily controlled and reproduced.

The process of the invention may be carried out according to any one of a number of different embodiments. For example, the solution of the cerium (IV) salt may be added to water, optionally containing an acid, and heated to the reaction temperature all at once, gradually or continuously, or vice versa.

In a preferred embodiment of the invention, the solution of the cerium (IV) salt and the hydrolysis medium are mixed together and the mixture is then heated under agitation to the reaction temperature.

It is also possible to carry out the process continuously. For such purpose, the mixture of the solution of the cerium (IV) salt and the hydrolysis medium is carried out simultaneously and continuously, and the mixture is heated continuously to the selected reaction temperature.

The duration of the hydrolysis reaction may range from 2 to 8 hr and preferably from 3 to 6 hr. Upon completion of the reaction, the formation of a precipitate is observed.

The yield of the hydrolysis reaction depends on the final equivalent concentration in cerium (IV) and the molar ratio $[H^+]/[Ce^{IV} eq.]$; it increases with the dilution of the reaction medium and with decreasing values of the molar ratio $[H^+]/[Ce^{IV} eq.]$. For example, it ranges from 100 to 25% for a final equivalent concentration in cerium (IV) equal to 0.35 mole/liter and a molar ratio $[H^+]/[Ce^{IV} eq.]$ of from 0 to 2.5.

The second stage of the subject process comprises separating the reaction mass upon completion of the reaction, said reaction mass being present in the form of a suspension, the temperature of which typically ranging from 90° C. to 100° C. This operation is carried out before or after cooling the reaction mass to ambient temperature, i.e., generally to from 10° C. to 25° C.

The precipitate is separated by conventional solid/liquid separation techniques: filtration, decantation, drainage and centrifugation.

The third stage of the process according to the invention comprises heat treating the separated precipitate.

This operation is optional because it has been found that the precipitate separated after the first hydrolysis stage is directly dispersible in water, and that it is possible to directly produce an aqueous sol by suspending the precipitate thus separated in water, without the need for any drying of same. In effect, the drying stage is not absolutely necessary and the complete elimination of all free water is not required.

In this case, the resultant product has the Formula (Ia):

$$Ce(OH)_x (NO_3)_y \cdot nH_2O \qquad (Ia)$$

wherein:

x is such that $x = 4 - y$;

y ranges from 0.35 to 0.7;

n is greater than or equal to 0 and less than or equal to approximately 20.

The cerium (IV) compound having the Formula (Ia) corresponds to a compound of the Formula (I) in which p is equal to 0 and n is greater than or equal to 0 and less than or equal to approximately 20.

By drying the separated precipitate, while controlling the parameters of time and temperature by increasing same, a cerium (IV) compound of the Formula (Ia) is obtained, in which n is greater than or equal to 0 or less than or equal to approximately 20, as are a cerium (IV) compound of the Formula (Ib) corresponding to a compound of Formula (I) in which n and p are equal to 0, a cerium (IV) compound of the Formula (Ic) corresponding to a compound of Formula (I), in which n is equal to 0 and p is greater than 0.

More particularly, the cerium (IV) compound is represented by the Formula (Ib):

$$Ce(OH)_x (NO_3)_y \qquad (Ib)$$

wherein:

x is such that $x = 4 - y$;

y ranges from 0.35 to 0.7;

The cerium content, expressed in % of CeO, ranges from 77 to 72%.

If the drying conditions are more rigorous and the $CeO_2$ content exceeds 72% when $y = 0.7$, 77% when $y = 0.35$ and a value from 77 to 72% when y ranges from 0.35 to 0.7, the compound obtained may be represented by the following Formula (Ic) which indicates the presence of ceric oxide:

$$Ce(OH)_x (NO_3)_y \cdot pCeO_2 \qquad (IC)$$

wherein:

x is such that $x = 4 - y$;

y ranges from 0.35 to 1.5;

p is greater than 0 and less than or equal to 2.0.

The conditions of drying may vary over broad limits. Thus, the temperature may range from 15° C. to 100° C. and preferably from ambient temperature to 50° C. The duration of drying preferably ranges from 5 to 48 hr in order to obtain a dry product (n=0). The drying operation may be carried out in air or under reduced pressure, for example, from 1 to 10 mm mercury (133.3322 Pa and 13332.2 Pa).

In the event that a dry product is produced, i.e., the product compound has the Formula (I) wherein n is equal to 0, such compound is crystalline.

X-ray diffraction analysis shows that it is a crystallized compound comprising a crystalline phase of $CeO_2$ type, having a size of from 5.41 Å to 5.44 Å and a crystalline portion of at least 40% and most frequently from 40 to 70%. In the crystalline portion, the size of the crystallites is small, generally less than 60 Å and preferably from 30 to 50 Å.

Whether it corresponds to Formulae (Ia), (Ib) or (Ic), the compound of the invention represented overall by Formula (I) is directly dispersible in water.

The present invention also features the aqueous sols produced from the cerium (IV) compound having the Formula (I).

Aqueous sol of the subject cerium (IV) compounds are produced by suspending the cerium (IV) compounds of the Formula (I) in water.

These compounds may be dispersed in an aqueous medium, or in a slightly acidic medium, such as to produce a sol having a pH of from 1 to 2.5.

The nature of the water is not critical and its temperature is typically ambient.

In a preferred embodiment, the preparation of the sol is carried out under agitation.

In the sols obtained according to the invention, the cerium (IV) compound is present essentially in the form of a colloidal dispersion in water, but this does not exclude the presence of Ce (IV) in the ionic form.

The proportion of cerium (IV) in the colloidal form is generally higher than 95% and preferably ranges from 99 to 100%.

According to the invention, an aqueous sol of the cerium (IV) compound may be produced, the concentration of which, expressed in $CeO_2$, may be up to 2 moles per liter and which preferably ranges from 0.5 to 1.0 mole/liter.

A sol may be produced wherein the size of the colloids varying over a rather wide range.

The size of the colloids is determined by measuring the median hydrodynamic diameter of the colloids by the quasi-elastic diffusion of light, by the method described by Michael L. McDonnel in *Analytical Chemistry*, Vol. 53, No. 8,1007 A (1981); said diameter may range from 100 Å to 1,000 Å.

The distribution of the colloid sizes is determined in the following manner: the colloid size being correlated with the measure of the coefficient of the translation diffusion of the particles, the uniform nature of the distribution is shown by measuring the variance, which is defined by the following ratio:

$$\overline{(D_T - \overline{D_T})2}/(\overline{D_T})^2$$

wherein $D_T$ is the coefficient of translation diffusion, a value that may be determined by the quasi-elastic diffusion of light. It is found that the variance generally ranges from 0.1 to 0.4 and is often about 0.2.

In a preferred embodiment of the invention, including mixing together the solution of the cerium (IV) salt and the hydrolysis medium and heating said mixture to the reaction temperature, the size of the colloids present in the sol may be controlled by varying the cerium (IV) concentration and the ratio of $[H^+]/[Ce^{IV} eq.]$ in the hydrolysis medium.

The size of the resulting colloids decreases with increasing values of the concentration in cerium (IV) and/or the $[H^+]/[Ce^{IV} eq.]$ ratio.

The colloids are formed by the aggregation of elementary crystallites, the size of which, determined by x-ray diffraction, is less than 60 Å and preferably ranges from 30 to 50 Å.

Consistent herewith, it is possible to control the state of aggregation of the elementary crystallites by varying the concentration of cerium (IV) and the $[H^+]/[Ce^{IV} eq.]$ ratio existing in the hydrolysis medium.

The state of aggregation of the crystallites increases with the cerium (IV) concentration and the $[H^+]/[Ce^{IV} eq.]$ ratio.

If the final equivalent concentration of cerium (IV) is less than 0.4 mole/liter and the $[H^+]/Ce^{IV} eq.]$ ratio is less than or equal to 0 and less than or equal to 0.75, or if, regardless of the final equivalent concentration of cerium (IV), the $[H^+]/Ce^{IV} eq.]$ ratio is greater than 0.75 and less than or equal to 3, sols characterized by a more compact arrangement of elementary crystallites are produced.

The precipitate obtained in this first stage of hydrolysis is first separated and then optionally subjected to heat treatment.

For purposes of illustration, referring to FIGS. 1 and 2, which are transmission electron micrographs (G=110,000) showing the state of aggregation of the crystallites.

[Ce IV]=0.23 mole/liter and the ratio $[H^+]/Ce^{IV}$ eq.]=0.5; said sol having been dried at 80° C.

Figure 2:
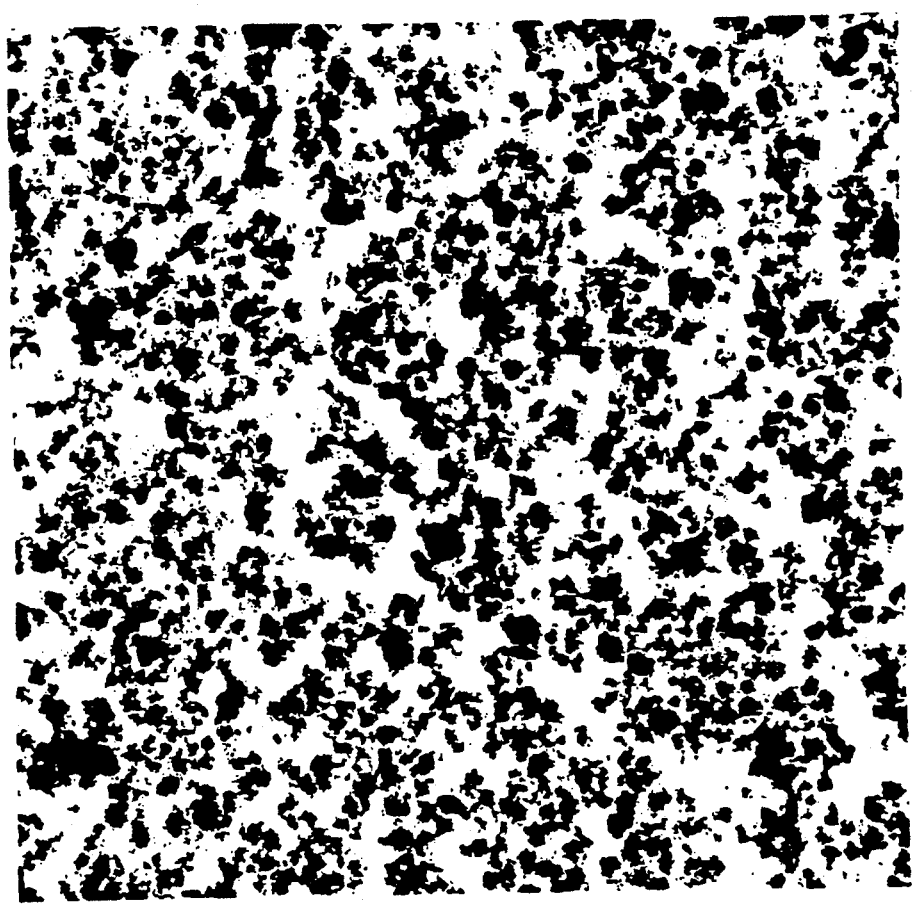

FIG. 2 shows the state of aggregation of a sol produced under the same conditions, with the exception of the cerium (IV) concentration, which is 0.46 mole/liter.

A comparison of such two figures shows that the arrangement of the crystallites is less compact, if the cerium (IV) concentration is decreased.

In another embodiment for production of the sols, the colloids of which defining a compact arrangement of elementary crystallites, a solution of the cerium (IV) salt is added to water all at once, gradually or continuously, the water optionally containing an acid, and then heated to the reaction temperature, or vice versa.

Yet another embodiment includes carrying out the process continuously. To accomplish this, admixture of the solution of the cerium (IV) salt and the medium of hydrolysis is carried out simultaneously and continuously, and the mixture is continuously heated to the selected reaction temperature.

If the two initial solutions are admixed by the techniques described above, the molar ratio $[H^+]/[Ce^{IV} eq.]$ is greater than or equal to 0 and less than or equal to 3, and preferably ranges from 0 to 2.

The sols produced according to the invention are stable in storage; there is no settling after several months of storage.

By adding a base until a pH of about 3.0 is attained, preferably by addition of an aqueous ammonia solution, coarser colloids having a hydrodynamic diameter of from 300 to 2,000 Å may also be produced.

The cerium (IV) compounds of the invention, together with the corresponding sols, are useful intermediates in the preparation, in particular, of ceric oxides having a large specific surface.

In order to further illustrate the present invention and the advantages thereof, the following specific examples are given, it being understood that same are intended only as illustrative and in nowise limitative. In said examples to follow, all parts and percentages are given by weight.

EXAMPLE 1

(a) Preparation of a cerium (IV) compound having the Formula (Ic) wherein y=0.71, p=0.58 and n=0

Into a 2 liter three-necked flask equipped with a thermometer, an agitator, a system for the introduction of reagents, a reflux condenser and also a heating device, the following materials were introduced at ambient temperature:

(i) 1,220 cm³ distilled water; and (ii) 279 cm³ of a ceric nitrate solution prepared by electrolysis according to French Patent No. 2,570,087 and containing 1.25 moles/liter cerium (IV), 0.05 mole/liter cerium (III) and having a free acidity of 0.5 N.

In the hydrolysis medium, the concentration in cerium (IV), expressed as $CeO_2$, was equal to 40 g/liter and the molar ratio [$H^+$]/$Ce^{IV}$ eq.] was equal to 0.4.

The reaction medium was maintained under agitation and at reflux for 4 hr.

Filtration was carried out on sintered glass (porosity No. 3)

The resultant product was dried in an oven at 40° C. for 48 hr.

73.5 g of a yellow precipitate were recovered.

Chemical analysis of the final product showed that it had the following composition:

| | |
|---|---|
| Firing weight loss = | 20% |
| $CeO_2$ = | 80% |
| Molar ratio $NO_3$/$Ce^{IV}$ = | 0.45. |

The yield of the hydrolysis reaction was 98%.

Analysis by x-ray diffraction showed that the product of the invention was a crystalline material comprising a crystalline phase of the $CeO_2$ type. It had a fluorine type structure, i.e., face centered cubic. A lattice parameter of 5.42 Å and a crystalline fraction of about 55% were determined.

(b) Preparation of an aqueous sol of the cerium (IV) compound 43 g of the compound prepared according to (a) were added to distilled water in an amount sufficient to produce a volume of 200 cm³.

A sol having a cerium (IV) concentration, expressed in $CeO_2$, of 172 g/liter (1 M) and a pH of about 1 was obtained.

Examination by the quasi-elastic diffusion of light showed the presence of colloids having a medium hydrodynamic diameter on the order of 900 Å and a colloid size distribution characterized by a variance of 0.3.

It was noted that the sol had good stability in storage and exhibited no settling for at least 6 months.

Figure 1:
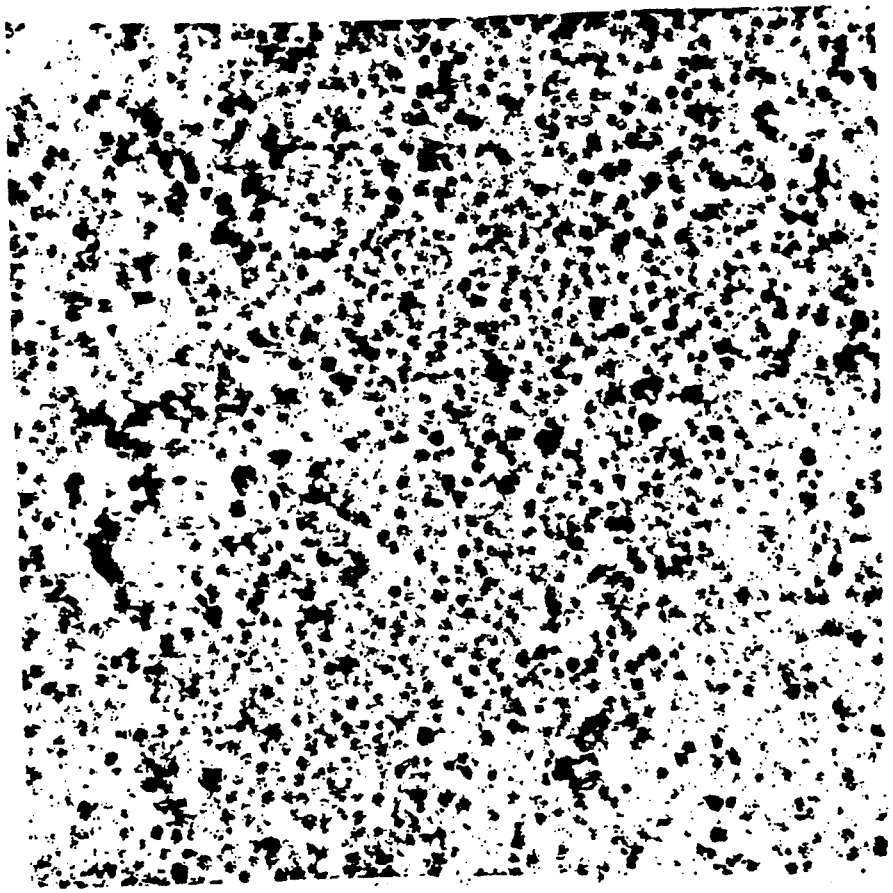
FIG. 1 corresponds to the state of aggregation of a sol produced from a cerium (IV) compound prepared as in Example 1 under the following conditions of hydrolysis.

The state of aggregation of the crystallites was similar to that shown in FIG. 1.

EXAMPLE 2

(a) Preparation of a cerium (IV) compound having the Formula (Ic) wherein n is equal to 0

The procedure of Example 1 was repeated, except that the following materials were used:
(i) 1,220 cm³ of a 0.315 N nitric acid solution; and
(ii) 279 cm³ of a ceric nitrate solution containing 1.25 moles/liter cerium (IV), 0.05 mole/liter cerium (III) and having a free acidity of 0.5 N.

In the hydrolysis medium, the cerium (IV) concentration, expressed as $CeO_2$ was equal to 40 g/l and the molar ratio [$H^+$]/$Ce^{IV}$ eq.] was equal to 1.5.

The reaction medium was maintained under agitation and at reflux for 4 hr.

The resultant product was filtered and dried as in Example 1.

76 g of a yellow precipitate were recovered.

Chemical analysis of the product showed that it had the following chemical composition:

| | |
|---|---|
| Firing weight loss = | 22.5% |
| $CeO_2$ = | 77.5% |

A hydrolysis yield of 98.1% was determined.

X-ray diffraction analysis indicated a degree of crystallization on the order of 98.1%.

(b) Preparation of an aqueous sol of the cerium (IV) compound 44.4 g of the compound prepared according to (a) were added to distilled water in a amount sufficient to produce a volume of 200 cm³.

Examination of the sol thus produced by the quasi-elastic diffusion of light showed the presence of colloids having a medium hydrodynamic diameter of approximately 600 Å and a colloid size distribution characterized by a variance equal to 0.15.

EXAMPLE 3

(a) Preparation of a cerium (IV) compound having the Formula (Ic) wherein y = 1.37, p = 1.85 and n = 0

The procedure of Example 1 was repeated, except that the following materials were used:
(i) 1,220 cm³ of a 0.6 N nitric acid solution; and
(ii) 279 cm³ of a ceric nitrate solution containing 1.25 moles/liter cerium (IV), 0.05 mole/liter cerium (III) and having a free acidity of 0.5 N.

In the hydrolysis medium, the concentration in cerium (IV), expressed as $CeO_2$, was 40 g/l and the molar ratio [$H^+$]/$Ce^{IV}$ eq.] was equal to 2.5.

The reaction medium was maintained under agitation and at reflux for 4 hr.

The resulting product was filtered and dried as in Example 1.

68.2 g of a yellow precipitate were recovered.

Chemical analysis of the final product showed the following composition:

| | |
|---|---|
| Firing weight loss = | 16.6% |
| $Ce_2$ = | 83.4% |
| Molar ratio $NO_3$/$Ce^{IV}$ = | 0.48 |

(b) Preparation of an aqueous sol of the cerium (IV) compound 42.75 g of the compound prepared according to (a) were added to distilled water in an amount sufficient to produce a volume of 200 cm³.

A sol having a cerium (IV) concentration, expressed in $CeO_2$, of 172 g/liter was produced.

Examination of the sol thus produced by the quasi-elastic diffusion of light showed the presence of colloids having a medium hydrodynamic diameter of approximately 500 Å.

It was noted that the sol had good stability in storage and exhibited no settling after at least 6 months.

EXAMPLE 4

(a) Preparation of a cerium (IV) compound having the Formula (Ic) wherein y = 0.84, p = 0.96 and n = 0

The following reagents were used:
(i) 942 cm³ distilled water; and (ii) 558 cm³ of a ceric nitrate solution containing 1.25 moles/liter cerium (IV), 0.05 mole/liter cerium (III) and having a free acidity of 0.5 N.

In the hydrolysis medium, the concentration in cerium (IV), expressed as $CeO_2$, was equal to 80 g/liter and the molar ratio $[H^+]/[Ce^{IV} eq.]$ was equal to 0.4.

The reaction medium was maintained under agitation and at reflux for 4 hr.

The resulting product was filtered and dried as in Example 1.

114 g of a yellow precipitate were recovered. it had the following chemical composition:

| | |
|---|---|
| Firing weight loss = | 18% |
| $CeO_2$ = | 82% |
| Molar ratio $NO_3/Ce^{IV}$ = | 0.43 |

A hydrolysis yield of 78% was determined.

(b) Preparation of an aqueous sol of the cerium (IV) compound 41.9 g of the compound prepared according to (a) were added to distilled water in an amount sufficient to produce a volume of 200 cm³.

A sol having a cerium (IV) concentration, expressed in $CeO_2$, of 172 g/liter and a pH of about 1.2 was obtained.

Examination of the sol thus produced by the quasi-elastic diffusion of light showed the presence of colloids having a median hydrodynamic diameter on the order of 650 Å and a colloid size distribution characterized by a variance equal to 0.2.

The state of aggregation of the crystallites was comparable to that shown in FIG. 2.

A comparison of FIGS. 1 and 2 shows that in the present case the arrangement of the crystallites is much more compact.

By the progressive addition of a 1.3 N ammonia solution at a rate of 20 cm³/hr to the sol previously produced and diluted with distilled water to a cerium concentration equal to 0.5 M, it was possible to obtain a sol having a higher pH, up to 3.0.

Examination of the sol after a 1/100 dilution, by the quasi-elastic diffusion of light, showed the presence of colloids having a median hydrodynamic diameter on the order of 2,000 Å.

EXAMPLE 5

(a) Preparation of a cerium (IV) compound having the Formula (Ic) wherein n is equal to 0

The procedure of Example 1 was repeated, except that the following materials were used:
(i) 1,081 cm³ of a 0.53 N nitric acid solution; and
(ii) 418 cm³ of a ceric nitrate solution containing 1.25 moles/liter cerium (IV), 0.05 mole/liter cerium (III) and having a free acidity of 0.5 N.

In the hydrolysis medium, the concentration in cerium (IV), expressed as $CeO_2$, was equal to 60 g/liter and the molar ratio $[H^+]/[Ce^{IV} eq.]$ was equal to 1.5.

The reaction medium was maintained under agitation and at reflux for 4 hr.

The resulting product was filtered and dried as in Example 1.

90 g of a yellow precipitate with a firing weight loss of 17.4% were recovered.

A yield of 82% of the hydrolysis reaction was determined.

X-ray diffraction analysis indicated a degree of crystallization of about 65%.

(b) Preparation of an aqueous sol of the cerium (IV) compound 41.6 g of the compound prepared according to (a) were added to distilled water in an amount sufficient to produce a volume of 200 cm³.

A sol having a concentration in cerium (IV), expressed as $CeO_2$, of 172 g/liter (1 M) and a pH of about 1, was produced.

Examination of the resulting sol by the quasi-elastic diffusion of light showed the presence of colloids having a median hydrodynamic diameter on the order of 500 Å and a colloid size distribution characterized by a variance of 0.1.

It was noted that the sol had good stability in storage and exhibited no settling for at least 6 months.

EXAMPLE 6

Preparation of a cerium (IV) compound having the Formula (Ic) wherein n is equal to 0

Into a reactor equipped with a thermometer, an agitator, a system for the introduction of reagents, a reflux condenser and also with a heating device, 1.89 liter of distilled water was introduced, at ambient temperature.

The temperature of the solution was increased to 100° C. under agitation and, over 3 hr, 1.11 liters of a ceric nitrate solution containing 1.25 moles/liter cerium (IV), 0.05 mole/liter cerium (III) and having a free acidity of 0.52 N, were added.

In the hydrolysis medium, the concentration in cerium (IV), expressed as $CeO_2$, was equal to 80 g/liter and the molar ratio $[H^+]/[Ce^{IV} eq]$ was equal to 0.4.

The reaction medium was maintained under agitation and at reflux for 3 hr.

Filtering was then carried out on sintered glass (porosity No. 3).

The resulting product was dried in an oven at 40° C. for 48 hr.

250 g of a compound of the Formula (Ic) and containing 80% by weight of $CeO_2$ were recovered.

The yield of the hydrolysis reaction was 84%.

(b) Preparation of an aqueous sol of the cerium (IV) compound:

53.75 g of the compound prepared according to (a) were added to distilled water in an amount sufficient to produce a volume of 250 cm³.

A sol having a concentration in cerium (IV), expressed as $CeO_2$, of 172 g/liter (1 M) was produced.

Examination by the quasi-elastic diffusion of light showed the presence of colloids having a median hydrodynamic diameter on the order of 450 Å.

EXAMPLE 7

(a) Preparation of a cerium (IV) compound having the Formula (Ic) wherein n is equal to 0

Into the apparatus described in Example 6, 2.182 liters of a 0.518 N nitric acid solution were introduced, at ambient temperature.

The temperature of this solution was increased to 100° C. under agitation and, over 3 hr, 817.6 cm³ of a ceric nitrate solution containing 1.28 moles/liter cerium (IV), 0.06 mole/liter cerium (III) and having a free acidity of 0.53 N, were added.

In the hydrolysis medium, the concentration in cerium (IV), expressed as $CeO_2$, was equal to 60 g/liter and the molar ratio $[H^+]/[Ce^{IV} eq.]$ was equal to 1.5.

The reaction medium was maintained under agitation and at reflux for 3 hr.

Filtration was carried out on sintered glass (porosity No. 3).

The resulting product was dried in an oven at 40° C. for 48 hr.

180 g of a compound of the Formula (Ic) and containing 82.6% by weight of $CeO_2$ were recovered.

The yield of hydrolysis reaction was 82.5%.

(b) Preparation of an aqueous sol of the cerium (IV) compound 52 g of the compound prepared according to (a) were added to distilled water in an amount sufficient to produce a volume of 250 cm$^3$.

A sol having a cerium (IV) concentration, expressed as $CeO_2$, of 172 g/liter (1 M) was produced.

Examination by the quasi-elastic diffusion of light showed the presence of colloids having a median hydrodynamic diameter on the order of 470 Å.

EXAMPLE 8

(a) Preparation of a cerium (IV) compound having the Formula (Ic) wherein n is equal to 0

Into an apparatus such as that described in Example 6, 2.455 liters of a 0.59 N nitric acid solution were introduced, at ambient temperature.

The solution was heated to 100° C. under agitation and, over 3 hr, 545 cm$^3$ of a ceric nitrate solution containing 1.28 moles/liter cerium (IV), 0.06 mole/liter cerium (III) and having a free acidity of 0.53 N, were added.

In the hydrolysis medium, the concentration in cerium (IV), expressed as $CeO_2$, was equal to 40 g/liter and the molar ratio $[H^+]/[Ce^{IV} eq.]$ was equal to 2.5.

The reaction medium was maintained under agitation and at reflux for 3 hr.

Filtering was carried out on sintered glass (porosity No. 3).

The resulting product was dried in an oven at 40° C. for 48 hr.

133.6 g of a compound of Formula (Ic) containing 83% by weight $CeO_2$ were recovered.

The yield of the hydrolysis reaction was 92.5%.

(b) Preparation of an aqueous sol of the cerium (IV) compound:

51.8 g of the compound prepared according to (a) were added to distilled water in an amount sufficient to produce a volume of 250 cm$^3$.

A sol having a cerium (IV) concentration, expressed as $CeO_2$, of 172 g/liter (1 M) was produced.

Examination by the quasi-elastic diffusion of light showed the presence of colloids having a median hydrodynamic diameter on the order of 570 Å.

EXAMPLE 9

(a) Preparation of a cerium (IV) compound having the Formula (Ic) wherein n is equal to 0

Into a reactor with a useful volume of 900 cm$^3$, equipped with an agitator, a system for the introduction of reagents, a reflux condenser, a heating device controlled at 100° C., and an overflow system, a solution of distilled water was simultaneously and continuously introduced, at a rate of 430 cm$^3$/hr, together with an aqueous ceric nitrate solution containing 1.23 moles/liter cerium (IV), 0.07 mole/liter cerium (III) and having a free acidity of 0.49 N, at a rate of 170 cm$^3$/hr.

A second similar reactor was situated such as to collect by gravity the reaction mixture emanating from the first reactor.

After 9 hours, required to establish steady state, a sample was drawn from the outlet of the second reactor.

Filtration was carried out on sintered glass.

The resulting product was dried in an oven at 40° C. for 48 hr.

60 g of a yellow precipitate containing 82% by weight $CeO_2$ were recovered.

Preparation of an aqueous sol of the cerium (IV) compound:

52.4 g of the compound prepared according to (a) were added to distilled water in an amount sufficient to produce a volume of 250 cm$^3$.

A sol having a cerium (IV) concentration, expressed as $CeO_2$, of 172 g/liter (1 M) was produced.

Examination by the quasi-elastic diffusion of light showed the presence of colloids having a median hydrodynamic diameter on the order of 600 Å.

EXAMPLE 10

(a) Preparation of a cerium (IV) compound having the Formula (Ic) wherein n is equal to 0

Into the apparatus described in Example 9, a 0.53 N aqueous solution of nitric acid was simultaneously and continuously introduced, at a rate of 430 cm$^3$/hr, together with an aqueous solution of nitric acid containing 1.23 moles/liter cerium (IV), 0.07 mole/liter cerium (III) and having a free acidity of 0.49 N, at a rate of 170 cm$^3$/hr.

In the hydrolysis medium, the cerium (IV) concentration, expressed as $CeO_2$, was equal to 60 g/liter and the molar ratio $[H^+]/[Ce^{IV} eq.]$ was equal to 1.5.

The reaction mixture flowed by gravity into a second reactor.

Filtration was carried out on sintered glass.

The resulting product was dried in an oven at 40° C. for 48 hr.

52 g of a yellow precipitate containing 83% by weight $CeO_2$ were recovered.

(b) Preparation of an aqueous sol of the cerium (IV) compound 51.8 g of a compound prepared according to (a) were added to distilled water in an amount sufficient to produce a volume of 250 cm$^3$.

A sol having a cerium (IV) concentration, expressed as $CeO_2$, of 172 g/liter was produced.

Examination by the quasi-elastic diffusion of light showed the presence of colloids having a median hydrodynamic diameter on the order of 550 Å.

EXAMPLE 11

(a) Preparation of a cerium (IV) compound having the Formula (Ic) wherein n is equal to 0

1—Preparation of the ceric nitrate solution

In this example, as starting material, a ceric nitrate solution prepared in the following manner was used:

Into a glass reactor equipped with an agitator, 1.17 liter of a concentrated 15 N nitric acid solution and 0.61 liter of distilled water were introduced and heated to boiling.

Into the hot nitric acid, 670 g of hydrated ceric oxide containing 495 g $CeO_2$ were introduced. The latter was prepared in conventional manner by reacting ammonia and hydrogen peroxide with a cerous nitrate solution (French Patent No. 2,416,867), the resulting precipitate not being dispersible in water.

By agitation for one-half hour while hot, 2.02 liters of a ceric nitrate solution containing 1.43 moles/liter cerium (IV), 0.03 mole/liter cerium (III) and a free acidity of 2.9 N, were obtained.

2—Preparation of cerium (IV) compound having the Formula (Ic)

Into a reactor equipped with a thermometer, an agitator, a system for the introduction of reagents, a reflux condenser and a heating device, 2.52 liters of distilled water were introduced, at ambient temperature.

The solution was heated to 100° C. under agitation and, over 3 hr, 0.485 liter of the previously prepared ceric nitrate solution containing 1.43 moles/liter cerium (IV) were added.

In the hydrolysis medium, the concentration in cerium (IV), expressed as $CeO_2$, was equal to 40 g/liter and the molar ratio $[H^+]/[Ce^{IV}$ eq.] was equal to 2.

The reaction medium was maintained under agitation and at reflux for 3 hr.

Filtration was carried out on sintered glass (porosity No. 3) and the resulting product was dried at 40° C. for 48 hr.

130 g of a yellow precipitate were recovered.

Chemical analysis of the product showed that it had the following composition:

| | |
|---|---|
| $CeO_2 =$ | 83.9% |
| Molar ratio $NO_3/CE^{IV} =$ | 0.35 |

A hydrolysis yield of 92% was determined.

(b) Preparation of an aqueous sol of the cerium (IV) compound:

51 g of the hydrate prepared as above were added to distilled water in an amount sufficient to produce a volume of 250 cm³.

A sol having a cerium (IV) concentration of 1 mole/liter was produced.

Examination by the quasi-elastic diffusion of light showed the presence of colloids having a median hydrodynamic diameter on the order of 360 Å.

EXAMPLE 12

(a) Preparation of a cerium (IV) compound having the Formula (Ia) wherein $y=0.4$, $p=0$ and $n=3.86$ A cerium (IV) compound was prepared by the procedure of Example 4, with the exception of the drying operation, which was eliminated.

The chemical analysis of the resulting product was as follows:

| | |
|---|---|
| Firing weight loss = | 41.8% |
| $CeO_2 =$ | 58.2% |
| Molar ratio $NO_3/Ce^{IV} =$ | 0.4 |

(b) Preparation of an aqueous sol of the cerium (IV) compound 60.3 g of the compound prepared according to (a) were added to distilled water in an amount sufficient to produce a volume of 200 cm³.

A sol having a cerium (IV) concentration, expressed as $CeO_2$, of 172 g/liter (1 M) and a pH of approximately 1.2 was produced.

Examination of the sol by the quasi-elastic diffusion of light showed the presence of colloids having a median hydrodynamic diameter on the order of 630 Å and a colloid size distribution characterized by a variance equal to 0.21.

EXAMPLE 13

(a) Preparation of a cerium (IV) compound having the Formula (Ia) wherein $y=0.45$, $p=0$ and n approximately 0.4

Into a 2 liter three-necked flask equipped with a thermometer, an agitator, a system for the introduction of reagents, a reflux condenser and a heating device, the following materials were introduced, at ambient temperature:

(i) 1,425 cm³ distilled water; and
(ii) 558 cm³ of a nitric acid solution containing 1.24 moles/liter cerium (IV), 0.06 mole/liter cerium (III) and having a free acidity of 0.8 N.

In the hydrolysis medium, the cerium (IV) concentration, expressed as $CeO_2$, was equal to 60 g/liter and the molar ratio $H^+/Ce^{IV}$ was equal to 0.64 g/liter.

The reaction medium was maintained under agitation and at reflux for 4 hr.

Filtration was carried out on sintered glass (porosity No. 3) in a thin layer (less than 5 mm) and under reduced pressure (160 mm mercury) and the filter cake was maximally compressed to insure vigorous drainage.

157 g of yellow precipitate were recovered.

Chemical analysis of the final product showed the following composition:

| | |
|---|---|
| Firing weight loss = | 17.5% |
| $CeO_2 =$ | 72.5% |
| Molar ratio $NO_3/Ce^{IV} =$ | 0.45% |

A hydrolysis yield of 96% was determined.

(b) Preparation of an aqueous sol of the cerium (IV) compound:

56 g of the compound prepared according to (a) were added to distilled water in an amount sufficient to produce a volume of 200 cm³.

A sol having a cerium (IV) concentration, expressed as $CeO_2$, of 200 g/liter (1.16 M) and a pH of 1.2 was produced.

Examination of the sol by the quasi-elastic diffusion of light showed the presence of colloids having a median hydrodynamic diameter of approximately 600 Å.

EXAMPLE 14

(a) Preparation of a cerium (IV) compound having the Formula (Ib) wherein $n=0$

The procedure of Example 13 was repeated, with the difference that, over 3 hr, 558 cm³ of said ceric nitrate solution were introduced into 1,425 cm³ of water (previously heated to 100° C.).

In the hydrolysis medium, the cerium (IV) concentration, expressed as $CeO_2$, was equal to 60 g/liter and the molar ratio $H^+/Ce^{IV}$ was equal to 0.64.

The reaction medium was maintained under agitation and at reflux for 3 hr.

Filtration was carried out on sintered glass (porosity No. 3) in a thin layer (less than 5 mm) and under reduced pressure (160 mm mercury) and the filter cake was compressed maximally to insure vigorous drainage.

The resulting product wa dried at 20° C. for 15 hr.

Chemical analysis of the final product showed the following chemical composition:

| | |
|---|---|
| Firing weight loss = | 23.4% |
| $CeO_2$ = | 76.6% |
| Molar ratio $NO_3/Ce^{IV}$ = | 0.37 |

A hydrolysis yield of 94% was determined.

(b) Preparation of a sol of the cerium (IV) compound 45 g of the compound prepared according to (a) were added to distilled water in an amount sufficient to produce a volume of 200 cm³.

A sol having a cerium (IV) concentration, expressed as $CeO_2$, of 172 g/liter was produced.

Examination of the sol by the quasi-elastic diffusion of light showed the presence of colloids having a median hydrodynamic diameter of approximately 200 Å and a pH of 1.2.

The state of aggregation of the crystallites was high and similar to that shown in FIG. 2.

It was noted that the sol had good stability in storage and exhibited no settling for at least 6 months.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A cerium (IV) compound, directly dispersible in water, having the general Formula (I):

$$Ce(OH)_x (NO_3)_y, pCeO_2 \cdot nH_2O \qquad (I)$$

wherein $x=4-y$; y ranges from 0.35 to 1.5; p is greater than or equal to 0 and less than or equal to 2.0; and n is greater than or equal to 0 and less than or equal to about 20; and wherein the $NO_3^-$ to Ce ratio is from 0.35 to 0.7.

2. The cerium (IV) compound as defined by claim 1, having the general Formula (Ia):

$$Ce(OH)_x (NO_3)_y \cdot nH_2O, \qquad (Ia)$$

wherein $x=4-y$; y ranges from 0.35 to 0.7; and n is greater than or equal to 0 and less than or equal to about 20.

3. The cerium (IV) compound as defined by claim 1, having the general Formula (Ib):

$$Ce(OH)_x (NO_3)_y \qquad (Ib)$$

wherein $x=4-y$; y ranges from 0.35 to 0.7; and the cerium content, expressed as $CeO_2$, ranges from 77 to 72%.

4. The cerium (IV) compound as defined by claim 1, having the general Formula (Ic):

$$Ce(OH)_x (NO_3)_y \cdot pCeO_2 \qquad (Ic)$$

wherein $x=4-y$; y ranges from 0.35 to 1.5; p is greater than 0 and less than or equal to 2.0; and the cerium content, expressed as $CeO_2$, is greater than a value between 77 and 72% depending on the variation of y from 0.35 to 0.7.

5. The cerium (IV) compound as defined by claim 1, wherein n is equal to 0 and comprising a crystalline phase of the $CeO_2$ type, having a lattice parameter of 5.41 Å to 5.44 Å and a crystalline fraction of at least 40%.

6. The cerium (IV) compound as defined by claim 5, said crystalline fraction ranging from 40 to 70%.

7. The cerium (IV) compound as defined by claim 5, wherein the size of the crystallites is less than 60 Å.

8. The cerium (IV) compound as defined by claim 7, wherein the size of the crystallites ranges from 30 to 50 Å.

9. A process for the preparation of a cerium (IV) compound as defined by Formula (I):

$$Ce(OH)_x (NO_3)_y, pCeO_2 \cdot nH_2O \qquad (I)$$

wherein $x=4-y$; y ranges from 0./35 to 1.5; p is greater than or equal to 0 and less than or equal to 2.0; and n is greater than or equal to 0 and less than or equal to about 20; and wherein the $NO_3^-$ to Ce ratio is from 0.35 to 0.7, comprising hydrolyzing an aqueous solution of a cerium (IV) salt in a nitric acid medium separating the precipitate which forms and optionally heat treating said precipitate.

10. The process as defined by claim 9, said aqueous solution of the cerium (IV) salt comprising an aqueous solution of ceric nitrate.

11. The process as defined by claim 9, said aqueous solution of the cerium (IV) salt comprising a solution resulting from electrochemical oxidation of a solution of cerous nitrate, or a solution resulting from the action of nitric acid on a hydrated ceric oxide.

12. The process as defined by claim 9, wherein the concentration of the solution of the cerium salt, expressed as cerium (IV), ranges from 0.3 to 3 moles per liter.

13. The process as defined by claim 9, wherein the medium of hydrolysis comprises distilled or deionized water.

14. The process as defined by claim 9, wherein the molar ratio $[H^+]/[Ce^{IV} eq.]$ is greater than or equal to 0 and less than or equal to 3.

15. The process as defined by claim 14, wherein said ratio ranges from 0.4 to 2.5.

16. The process as defined by claim 14, said acidity being provided by a 0.01 N to 5 N solution of ceric nitrate.

17. The process as defined by claim 9, wherein the proportion between the aqueous solution of the cerium (IV) salt and the medium of hydrolysis is such that the final equivalent concentration in cerium (IV) ranges from 0.1 to 1.0 mole/liter.

18. The process as defined by claim 17, wherein the final equivalent concentration in cerium (IV) range from 0.2 to 0.6 mole/liter.

19. The process as defined by claim 9, wherein the temperature of the reaction medium ranges from about 70° C. to about 120° C.

20. The process as defined by claim 19, wherein the temperature of the reaction medium is its reflux temperature.

21. The process as defined by claim 9, wherein the duration of hydrolysis ranges from 2 to 8 hr.

22. The process as defined by claim 9, including heat treatment in air or under a reduced pressure on the order of 1 to 100 mm mercury, at a temperature of from 15° C. to 100° C.

23. A process for the production of an aqueous sol from the cerium (IV) compound as defined by claim 1, comprising directly suspending said cerium (IV) compound in water.

24. The process as defined by claim 23, wherein the aqueous sol comprises colloids of elementary crystallites in the state of arrangement as shown in FIG. 1.

25. The process as defined by claim 23, wherein the aqueous sol comprises colloids of elementary crystallites in the state of arrangement as shown in FIG. 2.

26. The process as defined by claim 9, wherein said hydrolysis further comprises the substeps of:
a) mixing together said cerium (IV) salt and said nitric acid medium; and
b) thereafter heating said mixture to the hydrolysis reaction temperature.

27. The process as defined by claim 9, wherein said hydrolysis further comprises the substeps of:
a) heating said nitric acid medium to the hydrolysis reaction temperature; and
b) thereafter adding said aqueous solution of cerium (IV) salt to said heated acid medium.

28. The process as defined by claim 9, wherein said hydrolysis further comprises the substeps of:
a) continuously mixing together said cerium (IV) salt and said nitric acid medium; and
b) simultaneously heating said mixture to the hydrolysis reaction temperature.

29. The process as defined by claim 24, wherein said cerium (IV) compound is obtained by a process comprising the steps of:
a) mixing together under agitation a solution of a cerium (IV) salt and a nitric acid medium of hydrolysis;
b) heating said mixture to the hydrolysis reaction temperature, the molar ratio $[H^+]/[Ce^{IV} eq.]$ being less than or equal to 0.75 and the final equivalent concentration of cerium (IV) being less than 0.4 mole/liter;
c) separating the precipitate obtained from the solution; and
d) optionally heat treating said precipitate.

30. The process as defined by claim 25, wherein said cerium (IV) compound is obtained by a process comprising the steps of:
a) mixing together under agitation a solution of a cerium (IV) salt and a nitric acid medium of hydrolysis;
b) heating said mixture to the hydrolysis reaction temperature, the molar ratio $[H^+]/[Ce^{IV} eq.]$ being greater than or equal to 0 and less than or equal to 0.75 and the final equivalent concentration of cerium (IV) being greater than or equal to 0 and less than or equal to 0.75 and the final equivalent concentration of cerium (IV) being greater than or equal to 0.4 mole/liter, or the molar ratio $[H^{30}]/[Ce^{IV} eq.]$ being greater than 0.75 and less than or equal to 3;
c) separating the precipitate obtained from the solution; and
d) optionally heat treating said precipitate.

31. The process as defined by claim 25, wherein said cerium (IV) compound is obtained by a process for hydrolyzing an aqueous solution of a cerium (IV) salt in a nitric acid medium comprising the steps of:
a) heating said nitric acid medium to the hydrolysis reaction temperature;
b) thereafter adding said aqueous solution of cerium (IV) salt to said heated nitric acid medium, the molar ratio $[H^{30}]/[Ce^{IV} eq.]$ being greater than or equal to 0 and less than or equal to 3;
c) separating the precipitate obtained from the solution; and
d) optionally heat treating said precipitate.

32. The process as defined by claim 25, wherein said cerium (IV) compound is obtained by a process comprising the steps of:
a) continuously mixing together a solution of a cerium (IV) and a nitric acid medium of hydrolysis;
b) simultaneously heating said mixture to the hydrolysis reaction temperature, the molar ratio $[H^+]/[Ce^{IV} eq.]$ being greater than or equal to 0 and less than or equal to 3;
c) separating the precipitate obtained from the solution; and
d) optionally heat treating said precipitate.

33. The process as defined by claim 31, wherein the molar ratio $[H^+]/[Ce^{IV} eq.]$ is between 0 and 2.

34. The process as defined by claim 32, wherein the molar ratio $[H^+]/[Ce^{IV} eq.]$ is between 0 and 2.

35. An aqueous sol produced by the process as defined by claim 23, having a concentration in the cerium (IV) compound, expressed as $CeO_2$, of up to 2 moles/liter.

36. The aqueous sol as defined by claim 35, said concentration ranging from 0.5 to 1.0 mole/liter.

37. The aqueous sol as defined by claim 35, comprising a proportion of cerium in the colloidal state of greater than 95%.

38. The aqueous sol as defined by claim 37, wherein the median hydrodynamic diameter of the colloids ranges from 100 to 1,000 Å.

39. The aqueous sol as defined by claim 37, having a pH of about 3.0, and the median hydrodynamic diameter of the colloids thereof ranging from 300 to 2,000 Å.

* * * * *